United States Patent
Yu et al.

(10) Patent No.: US 12,090,504 B2
(45) Date of Patent: Sep. 17, 2024

(54) DEVICE AND METHOD FOR CONTROLLING SHAPE OF AEROSOL PARTICLE CONDENSATION GROWTH FLOW FIELD THROUGH ELECTROMAGNETIC FIELD

(71) Applicant: China Jiliang University, Zhejiang (CN)

(72) Inventors: Mingzhou Yu, Zhejiang (CN); Chenyang Liu, Zhejiang (CN); Yueyan Liu, Zhejiang (CN); Qianyu Zhang, Zhejiang (CN); Binbin Zhu, Zhejiang (CN); Taiquan Wu, Zhejiang (CN); Yanlong Cao, Zhejiang (CN); Yitao Zhang, Zhejiang (CN)

(73) Assignee: CHINA JILIANG UNIVERSITY, Zhejiang (CN)

( * ) Notice: Subject to any disclaimer, the term of this patent is extended or adjusted under 35 U.S.C. 154(b) by 517 days.

(21) Appl. No.: 17/445,618

(22) Filed: Aug. 23, 2021

(65) Prior Publication Data
US 2022/0055046 A1 Feb. 24, 2022

(30) Foreign Application Priority Data
Aug. 24, 2020 (CN) .......................... 202010854675.8

(51) Int. Cl.
*B01J 13/00* (2006.01)
*B05B 5/00* (2006.01)
*B05B 12/10* (2006.01)

(52) U.S. Cl.
CPC .............. *B05B 5/005* (2013.01); *B05B 12/10* (2013.01); *B01J 13/0095* (2013.01)

(58) Field of Classification Search
CPC ....... B01J 13/0095; B01J 19/087; G01N 1/28; G01N 1/38; G01N 1/42; B05B 5/005; B05B 12/10
See application file for complete search history.

(56) References Cited

U.S. PATENT DOCUMENTS

| 4,790,650 A * | 12/1988 | Keady .................. G01N 15/065 356/37 |
| 6,230,572 B1 * | 5/2001 | Pui ...................... G01N 15/0266 977/880 |

FOREIGN PATENT DOCUMENTS

| CN | 111744438 A | * 10/2020 | |
| CN | 111426543 B | * 9/2023 | .......... B01J 13/0095 |

* cited by examiner

*Primary Examiner* — Darren W Gorman
(74) *Attorney, Agent, or Firm* — Tutunjian & Bitetto, P.C.

(57) ABSTRACT

The present disclosure provides a device for controlling the shape of an aerosol particle condensation growth flow field through an electromagnetic field. The device includes an aerosol growth device and a power supply. The aerosol growth device includes a porous medium, magnetic rubber and an electromagnet group. The magnetic rubber is sleeved in an inner cavity of the electromagnet group, and the porous medium is sleeved in an inner cavity of the magnetic rubber. The magnetic rubber is clung or clings to the porous medium, and the power supply is connected with the electromagnet group. The present disclosure also provides a method for controlling the shape of the aerosol particle condensation growth flow field through the electromagnetic field.

10 Claims, 5 Drawing Sheets

DEVICE AND METHOD FOR CONTROLLING SHAPE OF AEROSOL PARTICLE CONDENSATION GROWTH FLOW FIELD THROUGH ELECTROMAGNETIC FIELD

CROSS REFERENCE TO RELATED APPLICATION(S)

This patent application claims the benefit and priority of Chinese Patent Application No. 202010854675.8, filed on Aug. 24, 2020, the disclosure of which is incorporated by reference herein in its entirety as part of the present application.

TECHNICAL FIELD

The present disclosure relates to the technical field of aerosol particle condensation growth, and specifically relates to a device and a method for controlling the shape of an aerosol particle condensation growth flow field through an electromagnetic field.

BACKGROUND ART

Aerosol concentration has a significant impact on environmental quality and is also directly related to human health. Extremely fine particles exist in some aerosol systems, and the range of particle sizes that can be detected by optical detection has been exceeded. In order to enable these fine particles to also be detected in an optical detection manner, condensation growth treatment needs to be carried out on the fine particles, so that the fine particles reach the size which can be measured by optical detection. In order to detect the concentration of the aerosol, the aerosol needs to be subjected to condensation growth treatment, so that the aerosol grows to the size capable of being optically detected. And for particles with different materials and characters, the flow fields of required growth environments also have different requirements.

Therefore, there is a need for improvements to the prior art.

SUMMARY

The technical problem to be solved by the present disclosure is to provide a device and a method for controlling the shape of an aerosol particle condensation growth flow field through an electromagnetic field.

In order to solve the technical problem, the present disclosure provides a device for controlling the shape of an aerosol particle condensation growth flow field through an electromagnetic field. The device comprises an aerosol growth device and a power supply, wherein the aerosol growth device comprises a porous medium, magnetic rubber and an electromagnet group.

The magnetic rubber is sleeved in an inner cavity of the electromagnet group, and the porous medium is sleeved in an inner cavity of the magnetic rubber; the magnetic rubber is clung to the porous medium.

The power supply is connected with the electromagnet group. As improvement of the device for controlling the shape of an aerosol particle condensation growth flow field through an electromagnetic field in the present disclosure, the electromagnet group is a circular electromagnet coil composed of a plurality of arc-shaped iron cores, and a winding coil is arranged on the edge of the arc-shaped iron core. The winding coils are connected with the power supply, and the magnetic rubber is prepared by taking rubber as a matrix and adding magnetic solid powder.

As improvement of the device for controlling the shape of an aerosol particle condensation growth flow field through an electromagnetic field in the present disclosure, the electromagnet group comprises direct-current electromagnets, and the power supply is a direct-current stabilized power supply.

As improvement of the device for controlling the shape of an aerosol particle condensation growth flow field through an electromagnetic field in the present disclosure, the device also comprises a shell, and the electromagnet group is sleeved in the shell; and the shell is an aluminum hexagonal shell.

As improvement of the device for controlling the shape of an aerosol particle condensation growth flow field through an electromagnetic field in the present disclosure, nine temperature measuring holes are formed in the shell in the length direction of the shell at equal intervals.

As improvement of the device for controlling the shape of an aerosol particle condensation growth flow field through an electromagnetic field in the present disclosure, the magnetic rubber is prepared by taking rubber as a matrix and adding magnetic solid powder.

The present disclosure also provides a method for controlling the shape of an aerosol particle condensation growth flow field through an electromagnetic field, comprising the following steps:
  adjusting the direction and the magnitude of current passing through the electromagnet group to control the magnetic pole direction and the magnetism magnitude of the electromagnet group by the power supply, so that the deformation degree of the magnetic rubber is changed; and
  when the magnetic rubber is affected by the ferromagnetism to deform, enabling the porous medium to deform as well, so that the shape of an inner channel of the porous medium is directly changed, and the shape of the flow field for condensation growth treatment of aerosol is changed.

According to the device and the method, water is selected as an aerosol growth medium, and the method for controlling the shape of an aerosol particle condensation growth flow field through an electromagnetic field is provided according to the principle that in the aerosol particle condensation growth process, temperature is firstly reduced and then heated for supersaturated growth in combination with common temperature control and water circulation equipment in the market.

The device and the method for controlling the shape of an aerosol particle condensation growth flow field through an electromagnetic field have the following technical advantages:
  Firstly, under the condition that no component is replaced, the shape of the growth section flow field can be changed only by changing the magnitude and the direction of direct current passing through the winding coils of the direct-current electromagnets, so that the requirements of condensation growth processes of fine particles with different characters can be met.
  Secondly, enough temperature sensors can completely obtain the temperature distribution condition of the flow field.

BRIEF DESCRIPTION OF THE DRAWINGS

The following further describes specific embodiments of the present disclosure with reference to the following attached figures.

Figure 1:
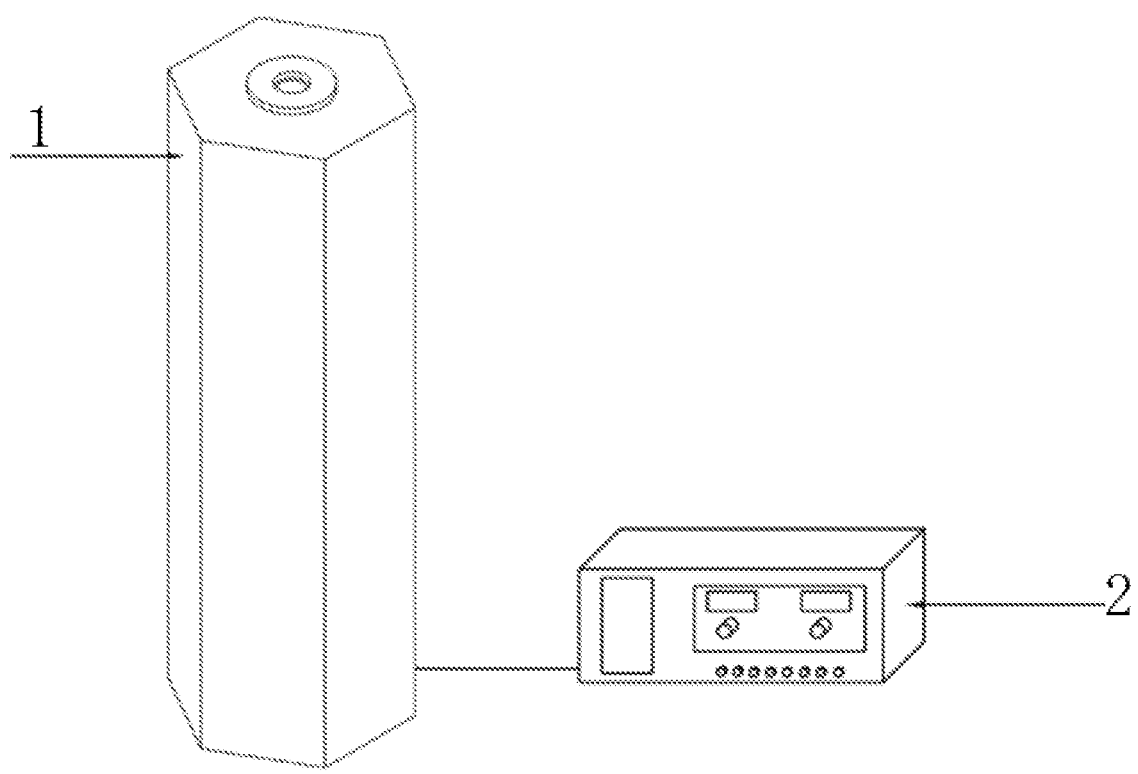
FIG. 1 is a structural schematic diagram of the device for controlling the shape of an aerosol particle according to the present disclosure.

Reference signs in drawings: aerosol growth device 1; power supply 2; direct-current electromagnet group 3; porous medium 4; magnetic rubber 5; aluminum hexagonal shell 6; winding coil 7; iron core 8; and temperature measuring hole 9.

DETAILED DESCRIPTION OF THE EMBODIMENTS

The present disclosure is further described below with reference to specific embodiments, but the scope of the present disclosure is not limited thereto.

Figure 2:
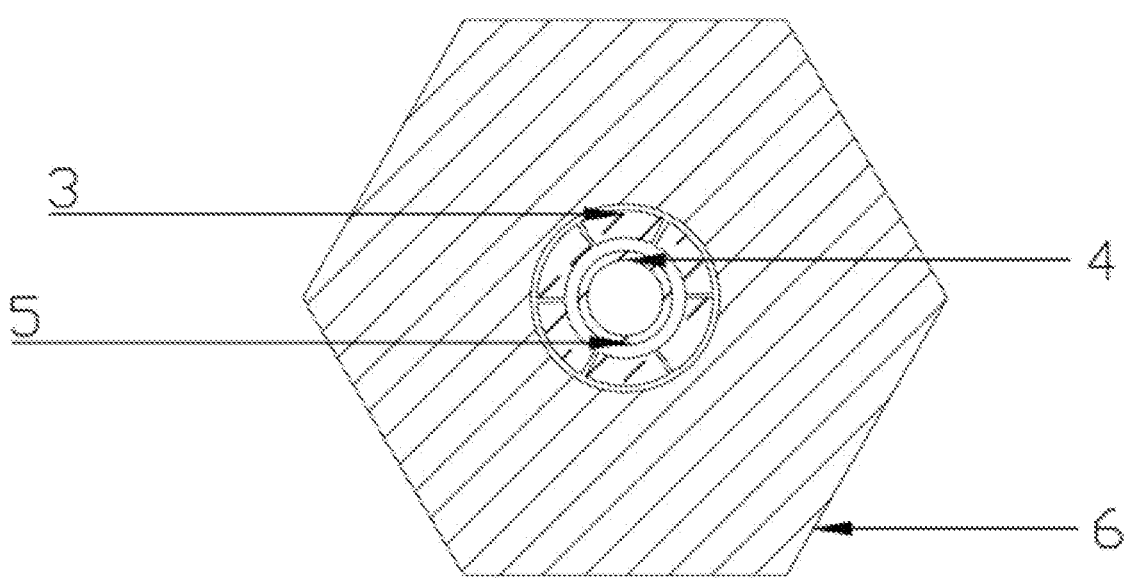
FIG. 2 is an over-looking cross-section structural schematic diagram of aerosol growth device 1 shown in FIG. 1.
Figure 3:
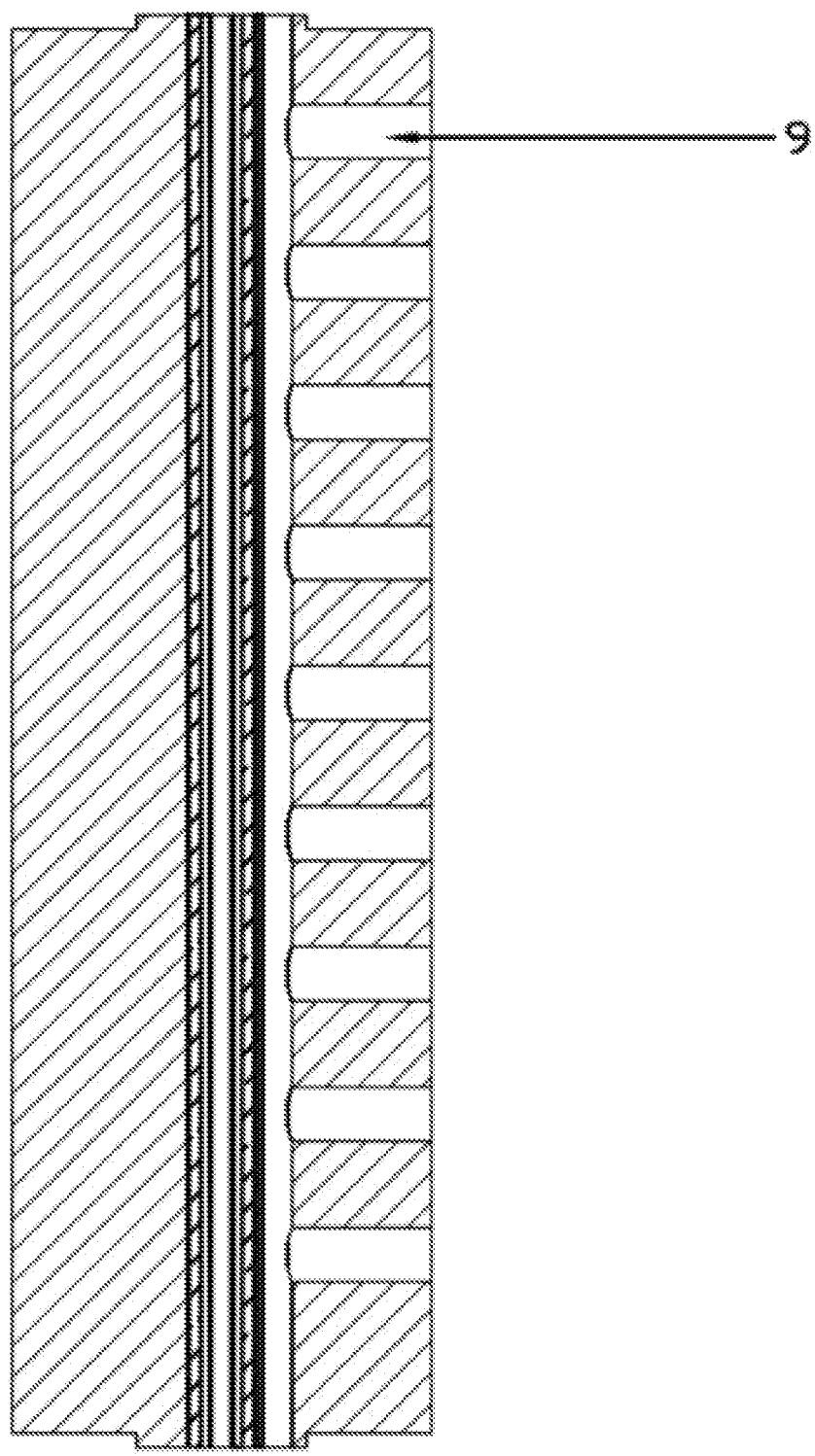
FIG. 3 is a side-looking cross-section structural schematic diagram of an aerosol growth device 1 in FIG. 1.
Figure 4:
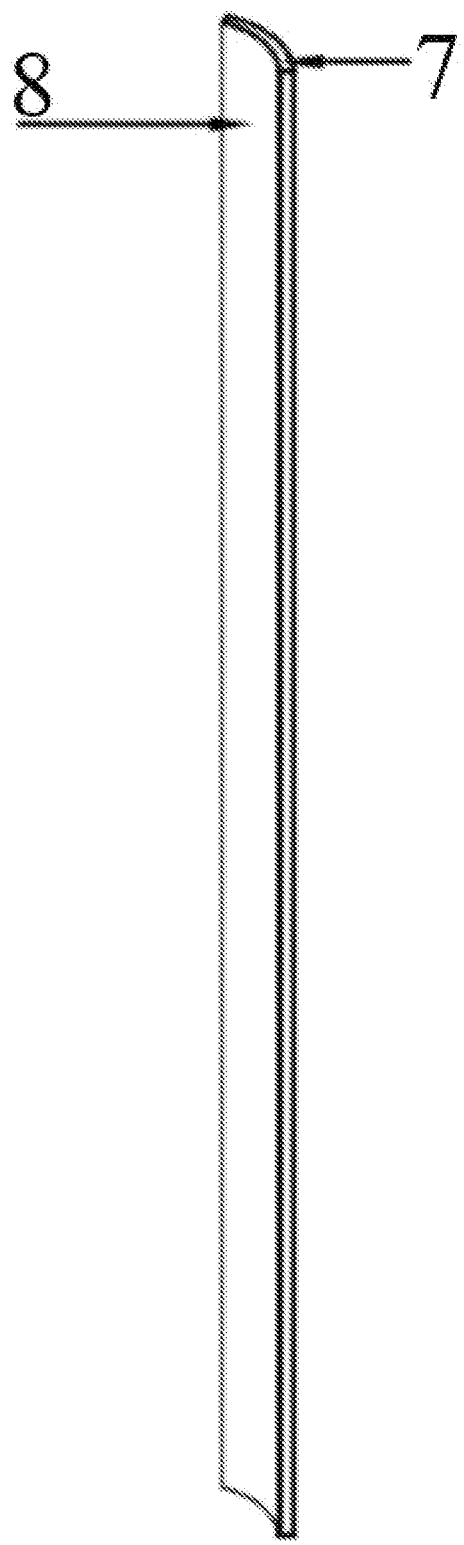
FIG. 4 is an amplified structural schematic diagram of an electromagnet group 3 shown in FIG. 2.
Figure 5:
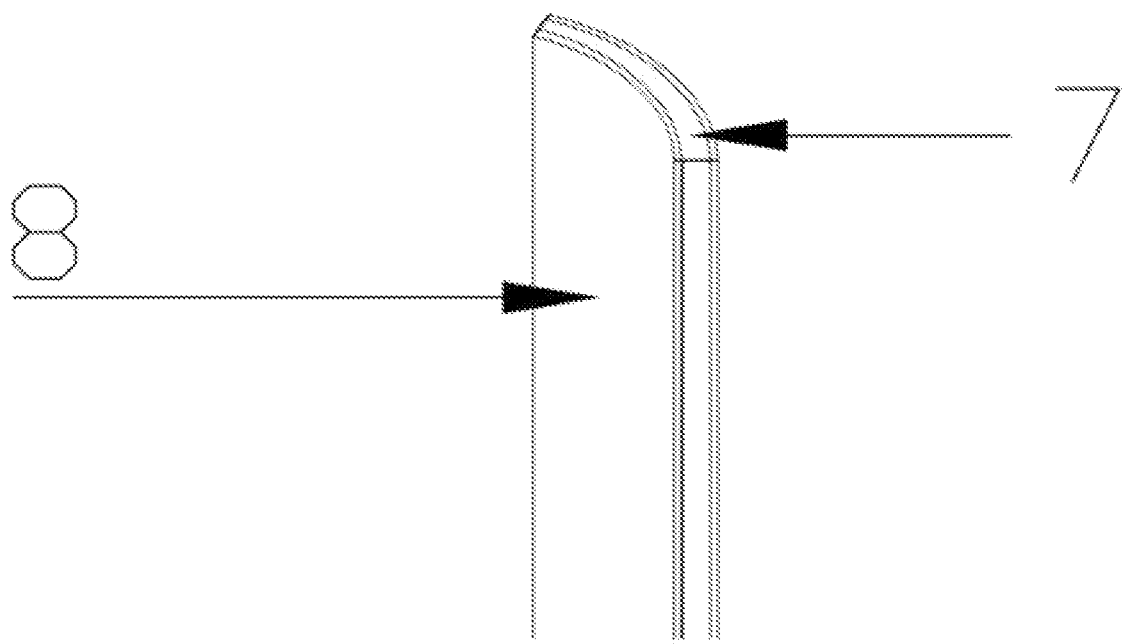
FIG. 5 is a partial enlarged drawing of the top of the electromagnet group 3.

In the first embodiment, a device for controlling the shape of an aerosol particle condensation growth flow field through an electromagnetic field, as shown in FIG. 1 to FIG. 5, comprises an aerosol growth device 1 and a power supply 2, the aerosol growth device 1 includes a porous medium 4, magnetic rubber 5, an electromagnet group 3, temperature measuring holes 9 and a shell 6.

The electromagnet group 3 is a circular electromagnet coil composed of a plurality of arc-shaped iron cores 8, and a winding coil 7 is arranged on the edge of the arc-shaped iron core 8.

The magnetic rubber 5 is sleeved in an inner cavity of the electromagnet group 3, the magnetic rubber 5 is circular as well, and the porous medium 4 is sleeved in an inner cavity of the magnetic rubber 5.

A certain hollow gap exists between the electromagnet group 3 and the magnetic rubber 5, and the magnetic pole direction and the magnetism magnitude are changed after the electromagnet group 3 is electrified, so that the magnetic rubber 5 deforms.

The magnetic rubber 5 is clung to the porous medium 4 through direct contact. Therefore, the shape of an inner channel of the porous medium 4 can be directly changed by changing the shape of the magnetic rubber 5, so that the shape of the flow field for condensation growth treatment of aerosol is changed, and the requirement for the growth of fine particles with different shapes is met. The porous medium 4 has good water absorption performance. Water vapor is continuously provided for a growth section flow field in an evaporation mode through water supply of an external system, and a supersaturated environment is created. The internal shape of the porous medium 4 is the internal shape of the growth section flow field.

The electromagnet group 3 is electrically connected with the power supply 2, and the power supply 2 adjusts the direction and magnitude of current passing through the electromagnet coil to control the magnetic pole direction and the magnetism magnitude of the electromagnet group 3.

The shell 6 further sleeves the outer side of the electromagnet group 3, and the shell 6 is, in this example, an aluminum hexagonal shell.

The magnetic rubber 5 is composed of rubber and solid magnetic powder. The magnetic rubber 5 is prepared by taking rubber as a matrix and adding magnetic solid powder. After the magnetic powder is processed, polycrystals which do not display anisotropy are changed into anisotropic single crystals, so that single crystal particles in a non-directional state in the rubber generate directional arrangement in a rubber matrix under the action of a high-intensity magnetic field, and magnetism can be displayed in a certain direction. The magnetic rubber 5 is in direct contact with the porous medium 4, and when the magnetic rubber 5 is affected by the ferromagnetism to deform, the porous medium 4 can deform as well.

The electromagnet group 3 comprises direct-current electromagnets, and the power supply 2 is a direct-current stabilized power supply. Compared with alternating-current electromagnets, the direct-current electromagnets adopt direct current and do not have positive and negative wave conversion. Therefore, under the condition that the voltage and the temperature are stable, the direct-current electromagnets can generate a stable magnetic field. The direct-current electromagnet used in the patent is composed of two parts such as an iron core 8 and a winding coil 7, and when direct current passes through the winding coil 7, the electromagnet group 3 (the direct-current electromagnets) generate magnetism. By changing the magnetism magnitude of the electromagnet group 3, the deformation degree of the magnetic rubber 5 can be changed. By changing the magnetic pole direction of the electromagnet group 3, the deformation degree of the magnetic rubber 5 can be changed. Therefore, the deformation of the magnetic rubber 5 can be completely controlled through the electromagnets. The magnetism magnitude of the electromagnet group 3 is determined by the magnitude of the direct current, and the magnetic pole direction of the electromagnet group 3 is determined by the direction of the direct current. Therefore, the power supply 2 is the direct-current stabilized power supply capable of adjusting the current direction and magnitude. Considering the current magnitude range required by the electromagnet group 3 used in the present disclosure, the power supply 2 is determined to adopt a DS1000 series direct-current stabilized power supply produced by Jishili Company through comparison.

The shell 6 may accommodate and protect the internal structures including the direct-current electromagnets. Meanwhile, the shell 6 is not magnetic, so that the normal operation of the direct-current electromagnets is not affected in the process of electrifying the direct-current electromagnets through direct current. Nine temperature measuring holes 9 are formed in the shell 6 in the length direction of the shell 6 at equal intervals, and a temperature sensor can be installed in the temperature measuring hole 9. The nine temperature sensors are arranged at equal intervals and measure the temperature at the same time, so that the temperature distribution condition in the growth section flow field can be obtained completely.

Finally, it also needs to be noted that what has been enumerated above are only a few specific embodiments of the present disclosure. Obviously, the present disclosure is not limited to the above embodiments, but many variations are possible. All variations that would be directly derived or suggested to those skilled in the art from what is disclosed herein are to be considered to be the scope of the present disclosure.

What is claimed is:

1. A device for controlling the shape of an aerosol particle condensation growth flow field through an electromagnetic field, comprising:

an aerosol growth device and a power supply, wherein the aerosol growth device comprises a porous medium, magnetic rubber and an electromagnet group connected to the power supply;

the magnetic rubber is sleeved in an inner cavity of the electromagnet group, and the porous medium is sleeved in an inner cavity of the magnetic rubber, where the magnetic rubber clings to the porous medium.

2. The device for controlling the shape of an aerosol particle condensation growth flow field through an electromagnetic field according to claim 1, wherein the electromagnet group is a circular electromagnet coil composed of a plurality of arc-shaped iron cores, and a winding coil is arranged on an edge of each arc-shaped iron core;

the winding coils are connected with the power supply; and the magnetic rubber is prepared by taking rubber as a matrix and adding magnetic solid powder.

3. The device for controlling the shape of an aerosol particle condensation growth flow field through an electromagnetic field according to claim 2, wherein the electromagnet group comprises direct-current electromagnets, and the power supply is a direct-current stabilized power supply.

4. The device for controlling the shape of an aerosol particle condensation growth flow field through an electromagnetic field according to claim 3, wherein the device further comprises an aluminum hexagonal shell, and the electromagnet group is sleeved in the shell.

5. The device for controlling the shape of an aerosol particle condensation growth flow field through an electromagnetic field according to claim 4, wherein nine temperature measuring holes are formed in the shell in a longitudinal direction of the shell at equal intervals.

6. A method for controlling the shape of an aerosol particle condensation growth flow field through an electromagnetic field by using the device for controlling the shape of an aerosol particle condensation growth flow field through an electromagnetic field according to claim 1, the method comprising:

adjusting a direction and the magnitude of current passing through the electromagnet group to control a magnetic pole direction and a magnetism magnitude of the electromagnet group by the power supply, so that a deformation degree of the magnetic rubber is changed; and when the magnetic rubber is affected by the ferromagnetism to deform, enabling the porous medium to deform as well, such that a shape of an inner channel of the porous medium is directly changed, and a shape of the flow field for condensation growth treatment of aerosol is changed.

7. The method according to claim 6, wherein the electromagnet group is a circular electromagnet coil composed of a plurality of arc-shaped iron cores, and a winding coil is arranged on an edge of each arc-shaped iron core;

the winding coils are connected with the power supply; and the magnetic rubber is prepared by taking rubber as a matrix and adding magnetic solid powder.

8. The method according to claim 7, wherein the electromagnet group comprises direct-current electromagnets, and the power supply is a direct-current stabilized power supply.

9. The method according to claim 8, wherein the device further comprises a shell, the electromagnet group is sleeved in the shell, and the shell is an aluminum hexagonal shell.

10. The method according to claim 9, wherein nine temperature measuring holes are formed in the shell in the length direction of the shell at equal intervals.

* * * * *